(12) United States Patent
Peiffer et al.

(10) Patent No.: US 9,169,370 B2
(45) Date of Patent: *Oct. 27, 2015

(54) POLYVINYL-AMINE ACID GAS ADSORPTION-DESORPTION POLYMERS, PROCESSES FOR PREPARING SAME, AND USES THEREOF

(75) Inventors: Dennis G. Peiffer, Annandale, NJ (US); David C. Calabro, Bridgewater, NJ (US); Quanchang Li, Dayton, NJ (US); Mobae Afeworki, Phillipsburg, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 955 days.

This patent is subject to a terminal disclaimer.

(21) Appl. No.: 13/332,560

(22) Filed: Dec. 21, 2011

(65) Prior Publication Data

US 2012/0164045 A1 Jun. 28, 2012

Related U.S. Application Data

(60) Provisional application No. 61/426,198, filed on Dec. 22, 2010.

(51) Int. Cl.
*B01J 20/22* (2006.01)
*B01J 20/26* (2006.01)
(Continued)

(52) U.S. Cl.
CPC . *C08J 9/28* (2013.01); *B01D 53/02* (2013.01); *B01D 53/62* (2013.01); *C08J 9/26* (2013.01); *B01D 53/047* (2013.01); *B01D 53/0462* (2013.01); *B01D 2253/202* (2013.01); *B01D 2253/311* (2013.01); *B01D 2257/304* (2013.01); *B01D 2257/504* (2013.01); *C08J 2201/026* (2013.01); *C08J 2201/0502* (2013.01);
(Continued)

(58) Field of Classification Search
None
See application file for complete search history.

(56) References Cited

U.S. PATENT DOCUMENTS 3,134,740 A * 5/1964 Sheetz ........................ 521/30
2007/0149398 A1 6/2007 Jones et al.
2011/0226697 A1* 9/2011 McLellan et al. ............ 210/651

OTHER PUBLICATIONS

Alauzun et al.,"CO2 as a Supramolecular Assembly Agent: A Route for Lamellar Materials with a High Content of Amine Groups", JACS, 127, 11204 (2005).
(Continued)

*Primary Examiner* — Stuart Hendrickson
*Assistant Examiner* — Daniel Berns
(74) *Attorney, Agent, or Firm* — Bruce M. Bordelon; Andrew T. Ward

(57) ABSTRACT

This disclosure involves an adsorption-desorption material, e.g., crosslinked polyvinyl-amine material having an $M_w$ from about 500 to about $1 \times 10^6$, total pore volume from about 0.2 cc/g to about 2.0 cc/g, and a $CO_2$ adsorption capacity of at least about 0.2 millimoles per gram of crosslinked material, and/or linear polyvinyl-amine material having an $M_w$ from about 160 to about $1 \times 10^6$, total pore volume from about 0.2 cc/g to about 2.0 cc/g, and a $CO_2$ adsorption capacity of at least about 0.2 millimoles per gram of linear material. This disclosure also involves processes for preparing the crosslinked polyvinyl-amine materials and linear polyvinyl-amine materials, as well as selective removal of $CO_2$ and/or other acid gases from a gaseous stream using the polyvinyl-amine materials.

10 Claims, 3 Drawing Sheets

$CO_2$ adsorption isotherm of PVBC:PEI (3:1) product from example 1 at 40°C.

(51) Int. Cl.
*C07C 211/01* (2006.01)
*B01J 20/28* (2006.01)
*C08J 9/28* (2006.01)
*B01D 53/02* (2006.01)
*B01D 53/62* (2006.01)
*C08J 9/26* (2006.01)
B01D 53/04 (2006.01)
B01D 53/047 (2006.01)

(52) U.S. Cl.
CPC .............. *C08J2339/02* (2013.01); *Y02C 10/04* (2013.01); *Y02C 10/08* (2013.01)

(56) References Cited

OTHER PUBLICATIONS

Sartori et al., "Sterically Hindered Amines for CO, Removal from Gases", Ind. Eng. Chem. Fundam., 22, 239 (1983).
Harlick et al., "Applications of Pore-Expanded Mesoporous Silica. 5. Triamine Grafted Material with Exceptional CO2 Dynamic and Equilibrium Adsorption Performance", Ind. Eng. Chem. Res., 46, 446 (2007).
Harlick et al., "Applications of Pore-Expanded Mesoporous Silicas. 3. Triamine Silane Grafting for Enhanced CO2 Adsorption", Ind. Eng. Chem. Res., 45, 3248 (2006).
Jadhav et al., "Monoethanol Amine Modified Zeolite 13X for CO2 Adsorption at Different Temperatures", Energy & Fuels, 21, 3555 (2007).
Gray et al., "Improved immobilized carbon dioxide capture sorbents", Fuel Processing Technology, 86, 1449 (2005).
Yue et al., "CO2 Capture by As-Prepared SBA-15 with an Occluded Organic Template", Adv. Funct. Mater. 16, 1717 (2006). ISSN: 1616-301X.
Li et al., "Preparation and Adsorption Properties of Polyethylenimine Containing Fibrous Adsorbent for Carbon Dioxide Capture", J. Appl. Poly. Sci., 108, 3851 (2008).
Hagg et al., "CO2 Capture from Natural Gas Fired Power Plants by Using Membrane Technology" Ind. Eng. Chem. Res., 44, 7668 (2005).
Zou et al., "CO2-selective polymeric membranes containing amines in crosslinked poly(vinyl alcohol)", J. Membr. Sci., 286, 310 (2006).

* cited by examiner

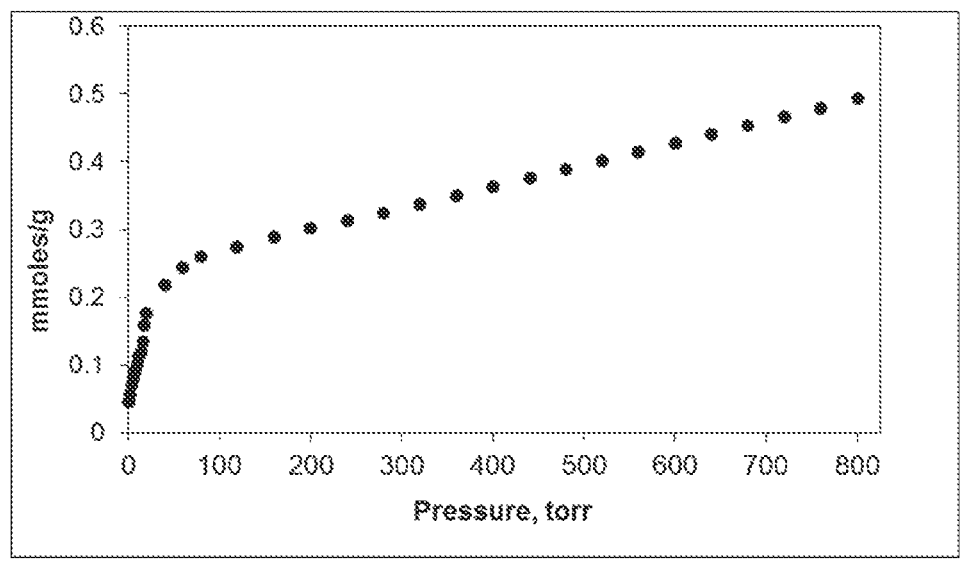
Figure 1 – $CO_2$ adsorption isotherm of PVBC:PEI (3:1) product from example 1 at 40°C.

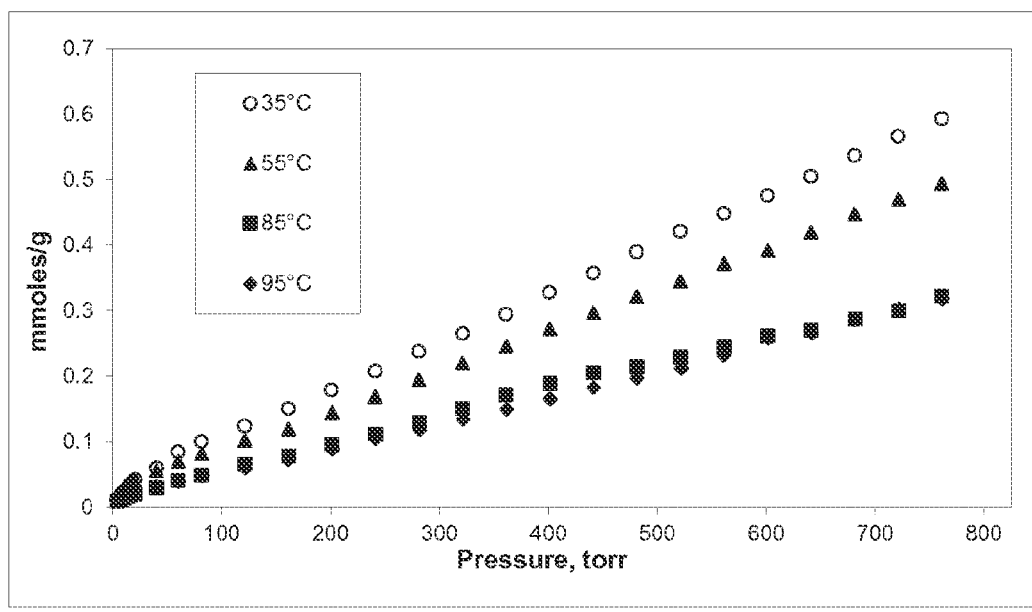
Figure 2 – Variable temperature $CO_2$ adsorption isotherms of PVBC:TEPA (1:1) product from example 3.

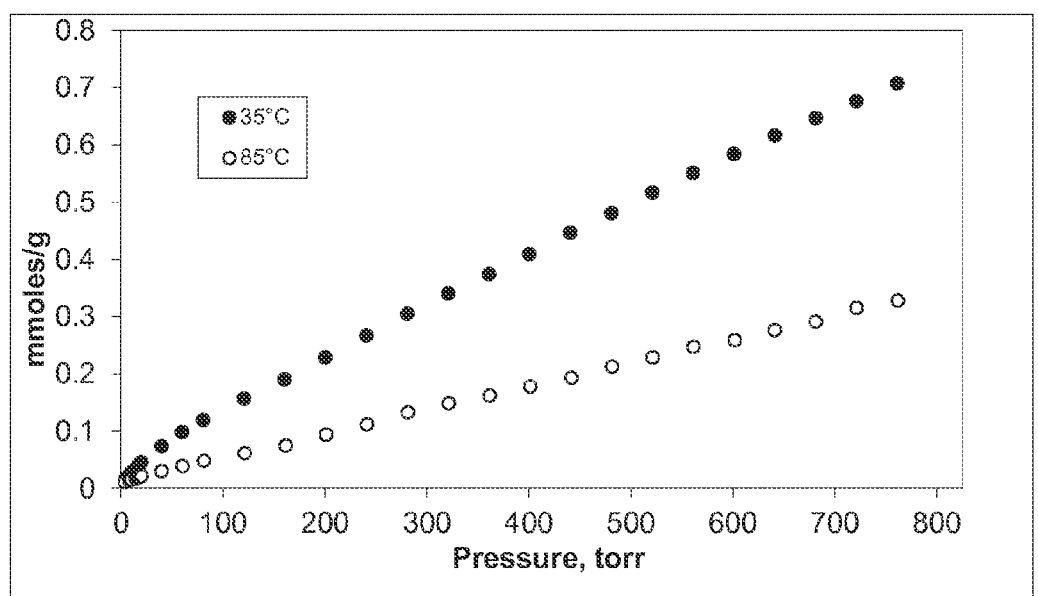
Figure 3 – $CO_2$ adsorption isotherms of PVBC:TEPA (4:3) product from example 4 at 35°C and 85°C.

POLYVINYL-AMINE ACID GAS ADSORPTION-DESORPTION POLYMERS, PROCESSES FOR PREPARING SAME, AND USES THEREOF

This application claims the benefit of U.S. Provisional Application No. 61/426,198 filed Dec. 22, 2010.

BACKGROUND

1. Field of the Disclosure

This disclosure relates in part to adsorption-desorption materials, in particular, to crosslinked polyvinyl-amine materials, and linear polyvinyl-amine materials, and to processes for the preparation of these materials. This disclosure also relates in part to the use of these materials in the selective removal of $CO_2$ and/or other acid gases from a gaseous stream containing one or more of these gases.

2. Discussion of the Background Art

The selective removal of carbon dioxide from mixed gas streams is of great commercial value. Commercially, carbon dioxide may be used for reinjection into gas or liquid hydrocarbon deposits to maintain reservoir pressure and for enhanced product recovery. Due to the advanced age of many producing reservoirs worldwide and the ever-increasing challenge of meeting demand, the expanding use of enhanced oil recovery (EOR) methods is becoming more widespread.

Typically the source of carbon dioxide for EOR is the producing hydrocarbon stream itself, which may contain anywhere from less than 5% to more than 80% of $CO_2$.

Additionally, it is desired to capture $CO_2$ from flue gas of various combustion sources, where the stream contains less than about 15% of $CO_2$ and its temperature is relatively high. Yet another need for $CO_2$ capture technology is for the pre-combustion capture of $CO_2$ from shifted syngas produced in fuel gasification processes.

Conventional methods for $CO_2$ capture include cryogenic distillation/condensation, absorption using liquid solvents, such as amine scrubbing, or sorption using solid sorbents, such as pressure swing adsorption (PSA) and/or temperature swing adsorption (TSA). However, with present technologies, all of these processes require a large temperature decrease of the gas stream to enable $CO_2$ condensation or sorption. Conventional methods (PSA, TSA, amine scrubbing) require $CO_2$ uptake at relatively low temperatures (e.g., less than 50° C.). Sorbent/solvent regeneration ($CO_2$ desorption) is accomplished by a step change decrease in $CO_2$ partial pressure (PSA), and/or by a temperature increase to above about 100° C. (TSA, amine scrubbing). In all of these cases, $CO_2$ capture costs depend significantly on the required heat exchange capacities and energy requirements for gas cooling/heating, the costs for steam generation for $CO_2$ desorption, and the high equipment and energy costs associated with $CO_2$ recompression.

Conventional amine scrubbing is based on the chemistry of $CO_2$ with amines to generate carbonate/bicarbonate and carbamate salts. Commercially, amine scrubbing typically involves contacting the $CO_2$ and/or $H_2S$ containing gas stream with an aqueous solution of one or more simple amines (e.g., monoethanolamine). The process requires high rates of gas-liquid exchange and the transfer of large liquid inventories between the absorption and regeneration steps and high energy requirements for the regeneration of amine solutions. This process is challenged by the corrosive nature of the amine solutions. These challenges limit the economic viability for large-scale applications (e.g., large combustion sources and power plants) utilizing conventional technologies.

The growing need to incorporate carbon capture and sequestration (CCS) into fossil fuel-based power generation, has triggered accelerating research into alternatives to conventional amine scrubbing technology. Cyclic adsorption technologies (e.g., PSA and TSA) using solid adsorbents are also well-known in the gas purification industry. These processes avoid many of the limitations of amine scrubbing described above, but suffer from a lack of adsorbents having sufficiently selective $CO_2$ adsorption under the humid conditions always present in combustion flue gas, as well as the commercial viability of large scale operation.

Due to the ever increasing use of $CO_2$ re-injection for enhanced oil recovery, technology that reduces the cost of $CO_2$ capture directly reduces hydrocarbon production costs. In addition, if anticipated future restrictions on $CO_2$ emissions are mandated, a low cost method for $CO_2$ capture will be a critical need as a part of CCS.

Carbon dioxide is a ubiquitous and inescapable by-product of the combustion of hydrocarbons. In addition to the use of $CO_2$ for EOR, there is growing concern over its accumulation in the atmosphere and its role in global climate change. Therefore in addition to the commercial benefits of $CO_2$ recovery, environmental factors may soon require its capture and sequestration. For these reasons the separation of $CO_2$ from mixed gas streams is a rapidly growing area of research.

Therefore, a need exists for developing commercially viable alternative methods and adsorbent materials for the selective removal of $CO_2$ from gas mixtures, particularly adsorption technologies and adsorbent materials having economic viability for large-scale (e.g., large combustion sources and power plants) applications.

SUMMARY OF THE DISCLOSURE

This disclosure relates in part to an acid gas adsorption-desorption material comprising a crosslinked polyvinyl-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof in preferred embodiments, the crosslinked polyvinyl-amine material is produced by adding a crosslinking agent selected from 2,4-bis(chloromethyl)-1,3,5-trimethylbenzene, 2,4,6-tris-(chloromethyl)-mesitylene, 1,3,5-tris-chloromethyl-2,4,6-trimethylbenzene, and mixtures thereof, to the reaction mixture of the organo halide and organo-amine.

In a preferred embodiment of the acid gas adsorption-desorption material, the crosslinked polyvinyl-amine material has a formula:

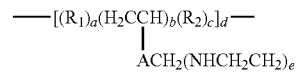

wherein a and c are integers equal to or greater than 0, and b, d, and e are integers equal to or greater than 1, the $NHCH_2CH_2$ groups can be linear or branched, $R_1$ and $R_2$ are the same or different alkyl or aryl moieties, and A can be an alkyl or aryl moiety.

This disclosure also relates in part to an acid gas adsorption-desorption material comprising a linear polyvinyl-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof.

In a preferred embodiment, the linear polyvinyl-amine material has a formula:

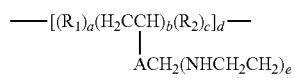

wherein a and c are integers equal to or greater than 0, and b, d, and e are integers equal to or greater than 1, the $NHCH_2CH_2$ groups can be linear or branched, R1 and R2 are the same or different alkyl or aryl moieties, and A can be an alkyl or aryl moiety.

This disclosure also relates in part to a process for preparing an acid gas adsorption-desorption material comprising a crosslinked polyvinyl-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; said process comprising (i) reacting at least one vinyl halide material comprised of at least one haloalkyl functional group and at least one vinyl functional group, with at least one organo-amine material under conditions sufficient to produce a functionalized organo-amine material, and (ii) crosslinking said functionalized organo-amine material under conditions sufficient to produce said crosslinked polyvinyl-amine material.

This disclosure also relates in part to a process for preparing an acid gas adsorption-desorption material comprising a linear polyvinyl-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; said process comprising reacting at least one vinyl halide material comprised of at least one haloalkyl functional group and at least one vinyl functional group, with at least one organo-amine material under conditions sufficient to produce said linear polyvinyl-amine material.

This disclosure also relates in part to a method for adsorption-desorption of an acid gas comprising:
contacting a gas mixture containing at least one acid gas with an adsorbent material under conditions sufficient to cause adsorption of at least a portion of said acid gas, said adsorbent material comprising (i) a crosslinked polyvinyl-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof, or (ii) a linear polyvinyl-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof; and
treating said adsorbent material under conditions sufficient to cause desorption of at least a portion of said acid gas.

This disclosure also relates in part to a method of separating carbon dioxide from a gas mixture comprising:
providing at least one adsorption zone comprising an adsorbent, said adsorbent comprising (i) a crosslinked polyvinyl-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof, or (ii) a linear polyvinyl-amine material having a weight average molecular weight of from about 160 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorbent material, or mixtures thereof;
passing said gas mixture comprising at least carbon dioxide through said at least one adsorption zone, wherein said adsorbent adsorbs at least part of the carbon dioxide from the mixture to provide a carbon dioxide-depleted gas; and
regenerating said adsorbent by desorbing a carbon dioxide-rich gas.

The adsorbent materials useful in this disclosure have the advantage of recovery of $CO_2$ at low pressure, low capital costs, low propensity for corrosion, and low regeneration energy compared to conventional processes where a large amount of energy is required to heat the aqueous amine solution.

Further objects, features and advantages of the present disclosure will be understood by reference to the following drawings and detailed description.

BRIEF DESCRIPTION OF THE FIGURES

FIG. 1 shows the $CO_2$ adsorption isotherm of PVBC:PEI (3:1) product from Example 1 at 40° C.

FIG. 2 shows the variable temperature $CO_2$ adsorption isotherms of PVBC:TEPA (1:1) product from Example 3.

FIG. 3 shows the $CO_2$ adsorption isotherms of PVBC: TEPA (4:3) product from Example 4 at 35° C. and 85° C.

DETAILED DESCRIPTION OF THE PREFERRED EMBODIMENT

The acid gas adsorption-desorption materials of this disclosure comprise in part crosslinked polyvinyl-amine polymeric materials. The crosslinked polyvinyl-amine materials have a weight average molecular weight of from about 500 to about $1\times10^6$, preferably a weight average molecular weight of from about 600 to about $1\times10^5$, and more preferably a weight average molecular weight of from about $1\times10^3$ to about $5\times10^4$. The crosslinked polyvinyl-amine materials have an adsorption capacity of at least about 0.2 millimoles of $CO_2$ adsorbed per gram of adsorption-desorption material; preferably an adsorption capacity of at least about 0.5 millimoles of $CO_2$ adsorbed per gram of adsorption-desorption material, and more preferably an adsorption capacity of at least about 1.0 millimoles of $CO_2$ adsorbed per gram of adsorption-desorption material. This disclosure also includes mixtures of the crosslinked polyvinyl-amine materials.

Illustrative crosslinked polyvinyl-amine materials of this disclosure have a formula selected from:

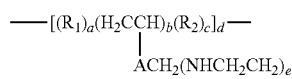

wherein a and c are integers equal to or greater than 0, and b, d, and e are integers equal to or greater than 1. The NHCH$_2$CH$_2$ groups can be linear or branched, and R$_1$ and R$_2$ are the same or different alkyl or aryl moieties, and A can be an alkyl or aryl moiety. The structure can be terminated with any of the starting vinyl monomers.

The vinyl halide and organo-amine monomers can both or independently be difunctional and/or multifunctional. In cases where both monomers are difunctional, the product will be a linear polyvinyl-amine polymer. If either the vinyl halide or organo-amine monomers have at least three functional groups, the product will be a crosslinked polyvinyl-amine polymer.

As used herein, "crosslinked" means polymer chains that are connected to one another through bonds. Crosslinks are bonds that link one polymer chain to another. When the polymer chains are connected to each other, they lose some of their ability to move as independent polymer chains.

The composition of the crosslinked polyvinyl-amine materials of this disclosure, including all polymers, copolymers and terpolymers thereof, can vary over a wide range, and need only be that amount necessary to provide the desired adsorption-desorption properties. These materials can be formed as bulk solids, films, membranes and particulates.

Preferably, the crosslinked polyvinyl-amine polymer materials of this disclosure have an average particle diameter of from about 0.1 microns to about 500 microns, preferably from about 1.0 microns to about 100 microns, and more preferably from about 2.0 microns to about 50 microns. Preferably, the crosslinked polyvinyl-amine polymer materials of this disclosure have a total pore volume of from about 0.2 cubic centimeters per gram (cc/g) to about 2.0 cc/g, preferably from about 0.4 cc/g to about 2.0 cc/g, and more preferably from about 0.5 cc/g to about 2.0 cc/g, as measured by mercury porsimetry in cubic centimeters of pore volume per gram of the porous crosslinked polyvinyl-amine materials, for all pores having a diameter of 0.005 microns to 10 microns.

Preferably, the crosslinked polyvinyl-amine polymer materials of this disclosure have an average pore size of from about 0.01 microns to about 1000 microns, preferably from about 0.1 microns to about 100 microns, and more preferably from about 1.0 microns to about 10 microns. Preferably, the crosslinked polyvinyl-amine polymer materials of this disclosure have a surface area of from about 5 square meters per gram (m$^2$/g) to about 50 m$^2$/g, preferably from about 20 m$^2$/g to about 50 m$^2$/g, and more preferably from about 25 m$^2$/g to about 50 m$^2$/g, as measured by mercury porsimetry.

The crosslinked polyvinyl-amine materials of this disclosure can be prepared by a process that involves reacting at least one vinyl halide material with at least one organo-amine material under conditions sufficient to produce the crosslinked polyvinyl-amine material. In particular, the crosslinked polyvinyl-amine materials can be produced by reacting at least one vinyl, halide or mixtures of vinyl halides, with at least one linear amine, branched amine, polyamine, or mixtures thereof, under conditions sufficient to produce the crosslinked polyvinyl-amine material. The crosslinked polyvinyl-amine materials of this disclosure may also be prepared by reacting at least one vinyl halide material with an organo-amine material thereby forming an intermediate vinyl-amine monomer, which can be further polymerized and/or crosslinked to form the final polyvinyl-amine material.

Illustrative vinyl halide starting materials useful in making the crosslinked polyvinyl-amine materials of this disclosure may be selected from a wide variety of materials known in the art. The vinyl halide materials herein can be either monomers or polymers that are comprised of at least one haloalkyl functional group and at least one vinyl functional group. Illustrative vinyl halide starting materials include, for example, vinyl benzylic halides and mixtures thereof. Preferably, the vinyl halide is selected from the group consisting of: vinylbenzylchloride, polyvinylbenzylchloride, p-xylylene dichloride, o-xylylene dichloride, m-xylylene dichloride and crosslinked polystyrene spheres with chemically attached chloromethylstyrene functionality. Vinyl halide starting materials which possess at least one haloalkyl functional group and at least one vinyl group can be prepared by conventional methods known in the art and/or are commercially available.

In addition to the vinyl halides above, chloromethyl-functionalized homopolymers, copolymers, terpolymers, block copolymers, tapered copolymers, graft copolymers and the like may also be utilized in making the polyvinyl-amine polymers of the present invention. Preferred chloromethyl-functionalized additives include: poly(styrene-co-chloromethylstyrene), poly(methacrylate-co-chloromethylstyrene), and poly(styrene-co-4-methylstyrene-chloromethylstyrene).

Other monomer types that could be functionalized with haloalkyl groups could include: styrenics, methacrylates, acrylates, vinyl chloride, acrylic acid, styrene sulfonate, maleic anhydride, reaction products of maleic anhydride (amines, alcohols), olefins, acrylamides, acrylonitrile, vinyl acetates, butadiene, alpha olefins, pyridine, vinyl fluoride, vinyl stearate, vinyl isobutyl ether, vinyl methyl ketone, vinyl octadecyl ether, vinyl benzoic acid, vinylidene chloride, methyl methacrylate, isoprene, ethylene, propylene, n-vinyl pyrrolidone, vinyl-containing liquid crystal monomers, vinyl-containing ionic liquid monomers, vinyl fluoride, vinyl imidazoles, alkenes, acrylamido-2-methylpropane sulfonic acid (and neutralized versions), maleic acid, vinyl alkyl ethers, vinyl sulfonic acid (and neutralized versions), vinyl silanes, other vinyl containing monomers known to those well-versed in the art, macromonomers (examples: vinyl terminated polystyrene, vinyl terminated methacrylates, vinyl terminated poly(ethyleneoxide), vinyl terminated polyolefins, vinyl terminated polydimethylsiloxanes), divinyl functionalized monomers, and combinations of the above monomers.

Illustrative organo-amine starting materials useful in making the crosslinked polyvinyl-amine materials of this disclosure may be selected from a wide variety of materials known in the art. Illustrative organo-amine starting materials include, for example, primary amities, secondary amines, and mixtures thereof. Suitable polyamines include, for example, linear polyamines, brandied polyamines, polyalkyleneimines, and mixtures thereof. Preferably, the organo-amine is selected from propylenediamine, tetraethylenepentaamine, branched and linear polyethyleneimines, and mixtures thereof. The organo-amine starting materials can be prepared by conventional methods known in the art and/or are commercially available.

As indicated above, mixtures of vinyl halide starting materials can be used in making the crosslinked polyvinyl-amine materials of this disclosure. For example, one or more aromatic compounds having at least one haloalkyl functional group and at least one vinyl functional group may be used in the vinyl halide starting material mixtures in the process of this disclosure. These compounds may be used alone or in combination with the vinyl halide compounds described below. Illustrative aromatic compounds having at least one haloalkyl functional group and at least one vinyl functional group include, for example, vinylbenzylchloride, polyvinylbenzylchloride, p-xylylene dichloride, o-xylylene dichloride, m-xylylene dichloride and crosslinked polystyrene spheres with chemically attached chloromethylstyrene functionality, and mixtures thereof. These aromatic vinyl halide compounds can be prepared by conventional methods known in the art and/or are commercially available.

One or more vinyl halides may also be used as starting materials in the process of this disclosure. These compounds may be used either alone or in combination with the aromatic vinyl halides compounds having at least one haloalkyl functional group and at least one vinyl functional group described above. These compounds may be used alone or in combination with the aromatic compounds having at least two haloalkyl functional groups described above. Illustrative alkyl halides include, for example, polyhalo-alkanes and polyhalo-alkenes having from 1 to about 12 carbon atoms. The polyhalo-alkanes and polyhalo-alkenes can be linear or branched, and contain two or more halide groups with no limit placed on their location on the alkane or alkene chain. The alkene chain can contain one or more carbon-carbon multiple bonds of indeterminate location on the chain. Mixtures of alkyl halides are also useful in this disclosure. These alkyl halide starting materials can be prepared by conventional methods known in the art and/or are commercially available.

Monofunctional reactants can be incorporated as potential structure disruptors and/or pore modifiers for functionality control. A non-limiting example of a monofunctional reactant is benzyl chloride.

A wide variation of crosslinkers can be useful in this disclosure. Cross linker modifications and network functionality can provide enhanced performance. The crosslinker structure can be varied (tri-/tetra-functional crosslinkers) as well as the crosslink density. Illustrative crosslinkers include, for example, 2,4-bis(chloromethyl)-1,3,5-trimethylbenzene, 2,4,6-tris-(chloromethyl)-mesitylene, 1,3,5-tris-chloromethyl-2,4,6-trimethylbenzene, and mixtures thereof, and the like.

One or more porogens may also be used as a component material in the fabrication processes and crosslinked polymers of this disclosure. An interpenetrating network of holes, closed cells or a combination thereof can be achieved in the crosslinked polymers of this disclosure by polymerization in the presence of an insoluble material such as a porogen. Subsequent removal of the porogen gives rise to interstices throughout the formed crosslinked polymer material. Porogen concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes. Illustrative porogens include, for example, xylene, toluene, polyvinylpyrrolidinone, and mixtures thereof. The porogens can be prepared by conventional methods known in the art and/or are commercially available.

The concentration of the vinyl halide starting material in the process of this disclosure can vary over a wide range, and need only be that minimum amount necessary to react with the organo-amine starting material and to provide the crosslinked or linear polyvinyl amine materials of this disclosure. In general, depending on the size of the reaction mixture, vinyl halide starting material concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the organo-amine starting material in the process of this disclosure can vary over a wide range, and need only be that minimum amount necessary to react with the vinyl halide starting material and to provide the crosslinked or linear polyvinyl amine materials of this disclosure. In general, depending on the size of the reaction mixture, organo-amine starting material concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the crosslinkers in the process of this disclosure can vary over a wide range, and need only be that minimum amount necessary to achieve desired crosslinking in the crosslinked polyvinyl-amine materials of this disclosure. In general, depending on the size of the reaction mixture, concentrations of crosslinkers in the range of from about 0.5 weight percent to about 50 weight percent, preferably from about 1.0 weight percent to about 40 weight percent, and more preferably from about 2.0 weight percent to about 30 weight percent, with respect to the overall reaction mixture, should be sufficient for most processes.

The concentration of the porogens in the process of this disclosure can vary over a wide range, and need only be that minimum amount necessary to achieve desired pore volume in the crosslinked or linear polyvinyl-amine materials of this disclosure. In general, depending on the size of the reaction mixture, concentrations of porogens in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Reaction conditions for the reaction of the vinyl halide starting material with the organo-amine starting material, such as temperature, pressure and contact time, may vary greatly. Any suitable combination of such conditions may be employed herein that are sufficient to produce the crosslinked or linear polyvinyl-amine materials of this disclosure. Preferred reaction pressure is less than about 100 psig. More preferably, the reaction pressure is approximately ambient (atmospheric) pressure. Preferred reaction temperatures can range from about 0° C. to about 150° C., more preferably from about 25° C. to about 95° C. The preferred reaction time of the vinyl halide with the organo-amine can range from about 60 seconds to about 48 hours. In an embodiment, the reaction is carried out under ambient pressure and the contact time may vary from a matter of seconds or minutes to a few hours or greater. The reactants can be added to the reaction mixture or combined in any order. The stir time employed is preferably from about 1 minute to about 48 hours, more preferably from about 1 hour to 24 hours, and even more preferably from about 2 hours to 8 hours. Isolation of the crosslinked or linear polyvinyl-amine materials may be achieved by any techniques known in the art, such as solvent evaporation or nonsolvent extraction and other conventional procedures, to afford the final material. Chemical crosslinking of the vinyl-containing monomers can be completed via well-known free radical initiators and are commercially available. Examples include: azonitriles, azo-derivatives, alkyl peroxides, acyl peroxides, hydroperoxides, ketone peroxides, peresters, peroxy carbonates, and the like.

The acid gas adsorption-desorption materials of this disclosure comprise in part linear polyvinyl-amine polymeric materials. Preferably, the linear polyvinyl-amine materials have a weight average molecular weight of from about 160 to about $1 \times 10^6$, preferably a weight average molecular weight of from about 400 to about $1 \times 10^5$, and more preferably a weight average molecular weight of from about 600 to about $1 \times 10^4$. Preferably, the linear polyvinyl-amine materials have an adsorption capacity of at least about 0.2 millimoles of $CO_2$ adsorbed per gram of the polyvinyl-amine material, preferably an adsorption capacity of at least about 0.5 millimoles of $CO_2$ adsorbed per gram of the polyvinyl-amine material, and more preferably an adsorption capacity of at least about 1.0 millimoles of $CO_2$ adsorbed per gram of the polyvinyl-amine material. This disclosure also includes mixtures of the linear polyvinyl-amine materials.

Illustrative linear polyvinyl-amine materials of this disclosure have a formula selected from:

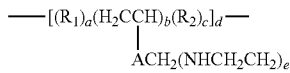

$$—[(R_1)_a(H_2CCH)_b(R_2)_c]_d—$$
$$|$$
$$ACH_2(NHCH_2CH_2)_e$$

wherein a and c are integers equal to or greater than 0, and b, d, and e are integers equal to or greater than 1. The $NHCH_2CH_2$ groups can be linear or brandied, and R1 and R2 are the same or different alkyl or aryl moieties, and A can be an alkyl or aryl moiety. The structure can be terminated with any of the starting vinyl monomers.

The vinyl halide and organo-amine monomers can both or independently be difunctional and/or multifunctional. In cases where both monomers are difunctional, the product will be a linear polyvinyl-amine polymer. If either the vinyl halide or organo-amine monomers have at least three functional groups, the product will be a crosslinked polyvinyl-amine polymer.

The composition of the linear polyvinyl-amine materials of this disclosure, including all polymers, copolymers and terpolymers thereof, can vary over a wide range, and need only be that amount necessary to provide the desired adsorption-desorption properties. These materials can be formed as bulk solids, films, membranes and/or particulates.

Preferably, the linear polyvinyl-amine polymer materials of this disclosure have an average particle diameter of from about 0.1 microns to about 500 microns, preferably from about 1.0 microns to about 100 microns, and more preferably from about 2 microns to about 50 microns. Preferably, the linear polyvinyl-amine polymer materials of this disclosure have a total pore volume of from about 0.2 cubic centimeters per gram (cc/g) to about 2.0 cc/g, preferably from about 0.4 cc/g to about 2.0 cc/g, and more preferably from about 0.5 cc/g to about 2.0 cc/g, as measured by mercury porsimetry in cubic centimeters of pore volume per gram of the porous crosslinked polyvinyl-amine materials, for all pores having a diameter of 0.005 microns to 10 microns.

Preferably, the linear polyvinyl-amine polymer materials of this disclosure have an average pore size of from about 0.01 microns to about 1000 microns, preferably from about 0.1 microns to about 100 microns, and more preferably from about 1.0 microns to about 10 microns. Preferably, the linear polyvinylo-amine polymer materials of this disclosure have a surface area of from about 5 square meters per gram ($m^2$/g) to about 50 $m^2$/g, preferably from about 20 $m^2$/g to about 50 $m^2$/g, and more preferably from about 25 $m^2$/g to about 50 $m^2$/g, as measured by mercury porsimetry.

The linear polyvinyl-amine materials of this disclosure can be prepared by a process that involves reacting at least one vinyl halide material with at least one organo-amine material under conditions sufficient to produce the linear polyvinyl-amine material. In particular, the linear polyvinyl-amine materials can be produced by reacting at least one vinyl halide or mixtures of vinyl halides, with at least one linear amine, or mixtures thereof, under conditions sufficient to produce the linear polyvinyl-amine material.

Illustrative vinyl halide starting materials useful in making the linear polyvinyl-amine materials of this disclosure may be selected from a wide variety of materials known in the art. The vinyl halide materials herein can be either monomers or polymers that are comprised of at least one haloalkyl functional group and at least one vinyl functional group. Illustrative vinyl halide starting materials include, for example, vinyl benzylic halides and mixtures thereof. Preferably, the vinyl halide is selected from the group consisting of: vinylbenzylchloride, polyvinylbenzylchloride, and crosslinked polystyrene spheres with chemically attached chloromethylstyrene functionality, vinylbenzylchloride, polyvinylbenzylchloride, p-xylylene dichloride, o-xylylene dichloride, m-xylylene dichloride, and mixtures thereof. Vinyl halide starting materials which possess at least one haloalkyl functional group and at least one vinyl group can be prepared by conventional methods known in the art and/or are commercially available.

In addition to the vinyl halides above, chloromethyl-functionalized homopolymers, copolymers, terpolymers, block copolymers, tapered copolymers, graft copolymers and the like may also be utilized in making the polyvinyl-amine polymers of the present invention. Preferred chloromethyl-functionalized additives include: poly(styrene-co-chloromethylstyrene), poly(methacrylate-co-chloromethylstyrene), and poly(styrene-co-4-methylstyrene-chloromethylstyrene).

Other monomer components include: styrenics, methacrylates, acrylates, vinyl chloride, acrylic acid, styrene sulfonate, maleic anhydride, reaction products of maleic anhydride (amines, alcohols), olefins, acrylamides, acrylonitrile, vinyl acetates, butadiene, alpha olefins, pyridine, vinyl fluoride, vinyl stearate, vinyl isobutyl ether, vinyl methyl ketone, vinyl octadecyl ether, vinyl benzoic acid, vinylidene chloride, methyl methacrylate, isoprene, ethylene, propylene, n-vinyl pyrrolidone, vinyl-containing liquid crystal monomers, vinyl-containing ionic liquid monomers, vinyl fluoride, vinyl imidazoles, alkenes, acrylamido-2-methylpropane sulfonic acid (and neutralized versions), maleic acid, vinyl alkyl ethers, vinyl sulfonic acid (and neutralized versions), vinyl silanes, other vinyl containing monomers known to those well-versed in the art, macromonomers (examples: vinyl terminated polystyrene, vinyl terminated methacrylates, vinyl terminated poly(ethyleneoxide), vinyl terminated polyolefins, vinyl terminated polydimethylsiloxanes), divinyl functionalized monomers, and combinations of the above monomers.

Illustrative organo-amine starting materials useful in making the linear polyvinyl-amine materials of this disclosure may be selected from a wide variety of materials known in the art. Illustrative organo-amine starting materials include, for example, primary amities, secondary amities, and mixtures thereof. Suitable polyamines include, for example, linear polyamines, linear polyalkyleneimines, and mixtures thereof. Preferably, the organo-amine is selected from propylenediamine, tetraethylenepentaamine, linear polyethyleneimines, and mixtures thereof. The organo-amine materials can be prepared by conventional methods known in the art and/or are commercially available.

As indicated above, mixtures of vinyl halide starting materials can be used in making the linear organo-amine materials of this disclosure. For example, one or more aromatic compounds having at least one haloalkyl functional group and at least one vinyl functional group may be used in the vinyl halide starting material mixtures in the process of this disclosure. These compounds may be used alone or in combination with the alkyl halide compounds described below. Illustrative aromatic compounds having at least one haloalkyl functional group and at least one vinyl functional group include, for example, vinylbenzylchloride, polyvinylbenzylchloride, p-xylylene dichloride, o-xylylene dichloride, m-xylylene dichloride and crosslinked polystyrene spheres with chemically attached chloromethylstyrene functionality, and mixtures thereof. These aromatic compounds having at least one haloalkyl functional group and at least one vinyl functional group can be prepared by conventional methods known in the art and/or are commercially available.

One or more vinyl halides may also be used as starting materials in the process of this disclosure. These compounds may be used either atone or in combination with the aromatic vinyl halides compounds having at least one haloalkyl functional group and at least one vinyl functional group described above. These compounds may be used alone or in combination with the aromatic compounds having at least two haloalkyl functional groups described above. Illustrative alkyl halides include, for example, polyhalo-alkanes and polyhalo-alkenes having from 1 to about 12 carbon atoms. The polyhalo-alkanes and polyhalo-alkenes can be linear or branched, and contain two or more halide groups with no limit placed on their location on the alkane or alkene chain. The alkene chain can contain one or more carbon-carbon multiple bonds of indeterminate location on the chain. Mixtures of alkyl halides are also useful in this disclosure. These alkyl halide starting materials can be prepared by conventional methods known in the art and/or are commercially available.

One or more porogens may also be used as a component material in the fabrication processes and linear polymers of this disclosure. An interpenetrating network of holes, closed cells or a combination thereof can be achieved in the linear polymers of this disclosure by polymerization in the presence of an insoluble material such as a porogen. Subsequent removal of the porogen gives rise to interstices throughout the formed linear polymer material. Porogen concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Illustrative porogens include, for example, xylene, toluene, polyvinylpyrrolidinone, and mixtures thereof. The porogens can be prepared by conventional methods known in the art and/or are commercially available.

The concentration of the vinyl halide starting material in the process of this disclosure can vary over a wide range, and need only be that minimum amount necessary to react with the organo-amine starting material and to provide the linear polyvinyl-amine materials of this disclosure. In general, depending on the size of the reaction mixture, vinyl halide starting material concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the organo-amine starting material in the process of this disclosure can vary over a wide range, and need only be that minimum amount necessary to react with the vinyl halide starting material and to provide the linear polyvinyl-amine materials of this disclosure. In general, depending on the size of the reaction mixture, organo-amine starting material concentrations in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

The concentration of the porogens in the process of this disclosure can vary over a wide range, and need only be that minimum amount necessary to achieve desired pore volume in the linear polyvinyl-amine materials of this disclosure. In general, depending on the size of the reaction mixture, concentrations of porogens in the range of from about 1.0 weight percent to about 75 weight percent, preferably from about 5 weight percent to about 50 weight percent, and more preferably from about 10 weight percent to about 30 weight percent, with respect to the overall reaction mixture, should be sufficient for most processes.

Reaction conditions for the reaction of the vinyl halide starting material with the organo-amine starting material, such as temperature, pressure and contact time, may vary greatly. Any suitable combination of such conditions may be employed herein that are sufficient to produce the linear polyvinyl-amine materials of this disclosure. Preferred reaction pressure is less than about 100 psig. More preferably, the reaction pressure is approximately ambient (atmospheric) pressure. Preferred reaction temperatures can range from about 0° C. to about 150° C., more preferably from about 25° C. to about 95° C. The preferred reaction time of the vinyl halide with the organo-amine can range from about 60 seconds to about 48 hours. In an embodiment, the reaction is carried out under ambient pressure and the contact time may vary from a matter of seconds or minutes to a few hours or greater. The reactants can be added to the reaction mixture or combined in any order. The stir time employed is preferably from about 1 minute to about 48 hours, more preferably from about 1 hour to 24 hours, and even more preferably from about 2 hours to 8 hours. Isolation of the linear polyvinyl-amine materials may be achieved by any techniques known in the art, such as solvent evaporation, nonsolvent extraction and other conventional methods, to afford the final material.

The reactions used to form the polyvinyl-amine adsorbent materials herein are preferably based on the reaction of vinylbenzylic halides (and polyvinylbenzyl chloride); specifically vinylbenzylchloride functionality, with a wide variety of amine and polyamine moieties. The reaction of vinylbenzylic chlorides with primary amities produces monomeric and polymerizable secondary amines, while the reaction with secondary amines produces tertiary amines. The use of low temperatures during the synthesis procedures are preferably utilized to facilitate the formation of secondary amities. In addition, various isomers of vinylbenzylchloride can be utilized, i.e., mixture of 3- and 4-isomers. Similar isomers exist in the polymerized species. Polymeric or monomeric species of vinylbenzylic halides may be utilized, such examples include:

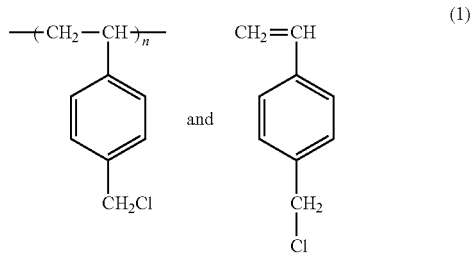

(1)

In addition to the above compounds and materials, a wide variety of nonionic, anionic, cationic, and reactive monomers can be useful components to the polyvinyl-amine adsorbent materials herein. Non-limiting examples of useful nonionic monomers are acrylamide, 1-vinylimidazole, and 1-vinyl-1, 2,4-triazole. A non-limiting example of a useful anionic monomer is acrylic acid. A non-limiting example of a useful cationic monomer is (vinylbenzyl)trimethylammonium chloride.

Non-limiting examples of useful reactive vinyl-containing comonomers include vinyl chloride, vinylidene, vinyl fluoride, vinyl acetate, vinyl stearate, vinyl isobutyl ether, vinyl methyl ketone, vinyl octadecyl ether, vinyl benzoic acid, vinyl imidazoles, vinyl sulfonic acid, vinyl silanes, acrylic acid, styrene sulfonate, maleic anhydride, acrylonitrile, butadiene, pyridine, methyl methacrylate, isoprene, ethylene, propylene, n-vinyl pyrrolidone, alpha olefins, alkenes, acrylamido-2-methylpropane sulfonic acid, and maleic acid. Other non-limiting examples of useful reactive monomers include styrenes, methacrylates, acrylates, acrylamides, olefins, vinyl-containing liquid crystal monomers, vinyl-containing ionic liquid monomers, alkenes, vinyl alky ethers, and divinyl functionalized monomers. Related vinyl oligomers, such as vinyl terminated polystyrene, vinyl terminated methacrylates, vinyl terminated poly(ethyleneoxide), vinyl terminated polyolefins, and vinyl terminated polydimethylsiloxanes, may also be used as reactive components for polymerization. Additionally, blends of any of the above mentioned compounds and polymeric materials are also included in the compositional range envisioned in this invention.

The method of this disclosure involves removing $CO_2$ and/or other acid gases, such as $H_2S$, from a gaseous stream containing one or more of these gases. The method of this disclosure is based on the selective adsorption of a gas mixture and involves contacting the gas mixture with a selective adsorbent in an adsorption zone. The adsorption zone is maintained at adsorption conditions (i.e., temperature and/or pressure) favorable to selectively adsorbing a component of the gas mixture and producing an adsorption effluent, which has reduced concentration of the adsorbed component relative to the gas mixture. Subsequently, the adsorbed component is then desorbed by changing the conditions in the adsorption zone to induce desorption. Alternatively, the selective adsorbent can be moved from the adsorption zone to a desorption zone having conditions favorable for desorption. Under desorption conditions, at least a portion of the adsorbed component is desorbed from the selective adsorbent. Following the desorptive step, the adsorption zone may be further purged with a purge gas to further remove the adsorbed component.

Once the adsorbent has been synthesized, it can be employed in a sorbent bed for use the adsorption-desorption process. Preferably, the adsorbent of this disclosure should be formed into a stable, mechanically strong form. These forms may include, for example, pellet forms or monolithic structures. The selection of the appropriate form is based on the application of the adsorbent and the type of equipment used. After the adsorbent form is selected and manufactured, it is used in a sorbent bed where a gaseous stream containing $CO_2$ contacts the adsorbent. In the adsorption process, the $CO_2$ and amine chemically react to form an amine complex, thereby removing the $CO_2$ from the gaseous stream.

After the adsorbent is loaded with $CO_2$ to a satisfactory level, for example, when greater than 80 percent of the amine has been converted to the amine complex, or at a designated cycle time, the adsorbent can be regenerated. Regeneration involves ceasing the flow of the gaseous stream through the bed and desorbing the adsorbed $CO_2$. The desorption can be accomplished by controlled temperature swing, pressure swing, partial pressure swing, or by the use of a sweeping or purge gas, or any combination thereof. During this step, the amine complex is dissociated, and $CO_2$ removed and the amine is freed and ready for re-use. In an embodiment, the adsorption-desorption can be carried out under essentially isothermal conditions.

The adsorbent material of this disclosure comprises a crosslinked polyvinyl-amine material or a linear polyvinyl-amine material. Suitable crosslinked polyvinyl-amine materials and linear polyvinyl-amine materials of this disclosure are described more fully herein.

Preferably, the polyvinyl-amine adsorbent materials herein possess an adsorption capacity of at least about 0.2 millimoles, preferably at least about 0.5 millimoles, and more preferably at least about 1.0 millimoles, of $CO_2$ adsorbed per gram of adsorbent when measured by a thermal gravimetric apparatus using a dry gas stream containing $CO_2$ (about 0.7 atmosphere partial pressure) and an inert gas. The polyvinyl-amine adsorbent can be regenerated from one cycle to another in cycling adsorption processes, and thus the polyvinyl-amine adsorbent is cyclically stable.

The adsorption beds can be configured in a variety of ways, for example, moving beds and fixed beds. The configuration is preferably a fixed bed wherein the fixed bed is fixed relative to the flow of the feedstream through the bed. In a moving bed configuration, the adsorbent in the adsorption bed and the gas mixture move through the adsorption zone in a continuous manner. Then the adsorbent is moved from the adsorption zone into the desorption zone.

In the preferred fixed bed configuration, the bed is fixed in a certain area of the cyclic adsorption apparatus and contains the adsorbent. The gas mixture passes through the fixed bed while under adsorption zone conditions. After a period of time when the adsorbent adsorbs a portion of the gas mixture, the conditions are changed in the area that includes the fixed bed to desorption zone conditions to desorb the adsorbed gases. Many cyclic adsorption apparatus configurations can include two or more fixed beds in separate regions or the apparatus, so that while one fixed bed is under adsorption conditions, the other fixed bed is under desorption conditions. Therefore, the gas stream can be operated in a continuous manner.

In general, for temperature swing adsorption processes, the temperature in the adsorption zone is lower than the temperature in the desorption zone, while the pressure is substantially constant. For pressure swing adsorption processes, the pressure in the adsorption zone is greater than the pressure of the desorption zone, while the temperature is substantially constant.

The temperature of the adsorption zone for cyclic adsorption processes depends upon a number of factors, such as the particular hydrocarbons present in the gas mixture being separated, the particular adsorbent being used, and the pressure at which the adsorption step is carried out. The upper and lower temperatures at which the adsorption zone is maintained is, in part, determined by both economics and the chemical reactivity of the components in the gas mixture. In particular, the temperature at which the adsorption zone is maintained should be below the temperature at which the gas mixture components undergo chemical reaction (e.g., hydrocarbons undergoing oligomerization and polymerization).

For the adsorption processes of this disclosure, the temperature of the inlet stream is preferably in the range of from about 20° C. to about 150° C., more preferably from about 75° C. to about 125° C., and even more preferably greater than about 80° C. In a preferred embodiment, the adsorption-desorption is carried out under essentially isothermal conditions. The pressure during adsorption is preferably in the range of from about 0.1 bar to about 300 bar (absolute), more preferably from about 0.1 bar to about 150 bar (absolute). The partial pressure of carbon dioxide in the gas mixture is preferably from about 0.1 to about 150 bar, more preferably from about 0.1 to about 20 bar, and even more preferably from about 0.1 to about 10 bar (absolute). The gas mixture can be contacted with the adsorbent bed material at a gas hourly space velocity (GHSV) of from about 200 to about 50,000 GHSV. The gas mixture can be contacted with the adsorbent material in the processes of this disclosure one or more times.

The carbon dioxide can be desorbed from the polyvinyl-amine adsorbent material by any conventional methods. One possibility is to desorb the carbon dioxide by means of an inert gas purge. Other possibilities include pressure swing adsorption including partial pressure swing adsorption, thermal swing adsorption, rapid cycle partial pressure swing adsorption, or any combination thereof.

For desorption, suitable pressures can range from preferably about 50 millibar to about 75 bar (absolute), more preferably from about 50 millibar to about 3 bar (absolute), even more preferably from about 100 millibar to about 1.5 bar (absolute). The temperature is preferably in the range of from about 50° C. to about 150° C., more preferably from about 75° C. to about 125° C., and even more preferably greater than about 80° C. In a preferred embodiment, the adsorption-desorption is carried out under essentially isothermal conditions.

For temperature swing adsorption processes, adsorbent regeneration of the polyvinyl-amine adsorbent material is carried out at a temperature higher than the adsorption temperature and below the temperature at which undesired reactions of the components of the gas mixture take place. For temperature swing adsorption processes, the adsorbent regeneration temperature is typically in the range of about 40° C. to less than about 200° C., preferably from about 60° C. to about 140° C. The pressures at which the adsorption and adsorbent regeneration steps are carried out are not critical for temperature swing adsorption processes, and in general these steps can be carried out at any of the usual pressures employed for cyclic adsorption processes.

It is understood that the polyvinyl-amine adsorbent materials disclosed herein are not limited to use for the removal of $CO_2$ from a gaseous stream. Rather the adsorbent can be used for the removal of any acid gas, or combination thereof, from a gaseous stream, provided that the acid gas is capable of reaction with amines.

The gas mixture containing carbon dioxide can originate from a natural or artificial source. The gas mixture can contain in addition to carbon dioxide, one or more other gases such as methane, ethane, n-butane, i-butane, hydrogen, carbon monoxide, ethene, ethyne, propene, nitrogen, oxygen, helium, neon, argon, krypton, and hydrogen sulfide.

The constituents of the gas mixture may have different proportions. The amount of carbon dioxide in the gas mixture is preferably at least 1 percent by volume, more preferably at least 10 percent by volume, and even more preferably 50 percent by volume or greater. The gas mixture can be any of a variety of gases, for example, natural gas, flue gas, fuel gas, waste gas and air.

The contacting of the gas mixture can be carried out by continuous adsorption on a fixed bed. The gas mixture is passed through the fixed adsorbent bed. Continuous adsorption can take place in two or more adsorbent beds in which at least one of the adsorbent beds contains the crosslinked organo-amine material or linear organo-amine material or a combination thereof.

The gas mixture can be subject to dehumidification prior to contacting with the adsorbent material. The dehumidification can be carried out by conventional methods. For example, the dehumidification can be carried out by adsorption over fixed bed reactors containing solid sorbents. Preferred solid sorbents include, for example, molecular sieves, silica gels or aluminas.

It will be appreciated that conventional equipment can be used to perform the various functions of the cyclic processes, such as monitoring and automatically regulating the flow of gases within the cyclic adsorption system so that it can be fully automated to run continuously in an efficient manner.

Various modifications and variations of this disclosure will be obvious to a worker skilled in the art and it is to be understood that such modifications and variations are to be included within the purview of this application and the spirit and scope of the claims.

EXAMPLES

The following representative examples employ polyvinylbenzylchloride (PVBC) as the vinylic polymer backbone. The polyamine functionalizing reagents used are tetraethylenepentamine (TEPA) and polyethylenimine (PEI). The mole ratio of the PVBC monomer unit to the polyamine is indicated the title of each example.

Adsorption data for Examples 1, 3 and 4 are presented in FIGS. 1-3 and Table 1.

Example 1

Preparation of 3:1 PVBC:PEI 1.5 g of PVBC was dissolved in 48.5 ml dry toluene under a nitrogen gas purge. Subsequently, 2.94 g (2.8 ml) of PEI (Mn~600 g/mol) was added with continual mixing at 50° C. Almost immediately after the addition of PEI the initially clear solution began to turn cloudy. White precipitate also appeared. Within approximately 2.5 hours the solution had a gel-like consistency. After stirring overnight, the toluene solvent was evaporated in vacuum. The material was washed with acetone for 30 minutes, and then neutralized with NaOH/methanol solution (2%) for one hour. The material was filtered and washed again with deionized water and acetone. Finally, the product was dried at 50° C. under vacuum for approximately 12 hours.

Example 2

Preparation of 2:1 PVBC:TEPA 1.5 g of PVBC was dissolved in 48.5 ml dry toluene under a nitrogen gas purge. Subsequently, 0.93 ml of TEPA was added dropwise with continual mixing at room temperature. Almost immediately after the addition of TEPA the initially clear solution began to turn cloudy. After overnight stirring, a cloudy suspension had formed. The solvent was removed by vacuum evaporation. The polymer was washed with acetone. The material was then neutralized with NaOH/methanol solution (2%) for 10 minutes under continual agitation. The solvent was decanted and the material was filtered and washed again with deionized water and acetone. Finally, the product was dried at room temperature under vacuum for approximately 12 hours.

Example 3

Preparation of 1:1 PVBC:TEPA 1.5 g of PVBC, was dissolved in 48.5 ml dry toluene under a nitrogen gas purge. Subsequently, 1.86 g of TEPA was added dropwise with continual mixing at room temperature. Almost immediately after the addition of TEPA the initially clear solution began to turn cloudy. Overnight stirring produced a fine suspension. The solvent was removed by vacuum evaporation. The polymer was washed with acetone. The material was then neutralized with NaOH/methanol solution (2%) for 1 hour under continual agitation. The solvent was decanted, then the material was filtered and washed again with deionized water and acetone. Finally, the product was dried at 56° C. under vacuum for approximately 12 hours.

Example 4

Preparation of 4:3 PVBC:TEPA 1.5 g of PVBC was dissolved in 48.5 ml dry toluene under a nitrogen gas purge. Subsequently, 1.4 g of TEPA was added dropwise with continual mixing at room temperature. Almost immediately after the addition of TEPA the initially clear solution began to turn cloudy. Overnight stirring produced a fine suspension. The solvent was removed by vacuum evaporation. The polymer was washed with acetone. The material was then neutralized with NaOH/methanol solution (2%) for 1 hour under continual agitation. The solvent was decanted, and the material was filtered and washed again with deionized water and acetone. Finally, the product was dried at 56° C. under vacuum for approximately 12 hours.

Example 5

Preparation of 4:3 PVBC:TEPA 5.0 g of PVBC was dissolved in 45.0 ml dry toluene under a nitrogen gas purge. Subsequently, 4.65 ml of TEPA was added dropwise with continual mixing at room temperature. Almost immediately after the addition of TEPA the initially clear solution began to turn cloudy (after approximately several minutes). After one hour, a polymer gel formed. The polymer was isolated via application of washing with acetone. The material was again washed with acetone for 30 minutes and dried in vacuum oven at 54° C. The material was then neutralized with NaOH/methanol solution (5%) for one hour under continual agitation. The material was filtered and washed again with deionized water and acetone. Finally, the product was dried at 56° C. under vacuum for approximately 12 hours.

While we have shown and described several embodiments in accordance with our disclosure, it is to be clearly understood that the same may be susceptible to numerous changes apparent to one skilled in the art. Therefore, we do not wish to be limited to the details shown and described but intend to show all changes and modifications that come within the scope of the appended claims.

What is claimed is:

1. An acid gas adsorption-desorption material comprising a crosslinked polyvinyl-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; wherein said crosslinked polyvinyl-amine material is produced by reacting one vinyl halide material comprised of at least one haloalkyl functional group and at least one vinyl functional group, with at least one organo-amine, said at least one organo-amine comprising a linear amine, a branched amine, a polyamine, or mixtures thereof, and further reacting with a chloromethyl-functionalized additive selected from the group consisting of poly(styrene-co-chloromethylstyrene), poly(methacrylate-co-chloromethylstyrene), and poly(styrene-co-4-methylstyrene-chloromethylstyrene, under conditions sufficient to produce crosslinked polyvinyl-amine material.

2. The acid gas adsorption-desorption material of claim 1 wherein said at least one vinyl halide is comprised of an aromatic vinyl halide.

3. The acid gas adsorption-desorption material of claim 1 wherein said at least one vinyl halide is comprised of an alkyl vinyl halide.

4. The acid gas adsorption-desorption material of claim 1 wherein said at least one organo-amine comprises a primary amine, a secondary amine, or mixtures thereof, and said polyamine comprises a linear polyamine, a branched polyamine, or mixtures thereof.

5. An acid gas adsorption-desorption material comprising a crosslinked polyvinyl-amine material having a weight average molecular weight of from about 500 to about $1\times10^6$, a total pore volume of from about 0.2 cubic centimeters per gram (cc/g)to about 2.0 cc/g, and an adsorption capacity of at least about 0.2 millimoles of $CO_2$ adsorbed per gram of adsorption-desorption material, or mixtures thereof; wherein said crosslinked polyvinyl-material is produced by reacting one vinyl halide material comprised of at least one haloalkyl functional group and at least one vinyl functional group, with at least one organo-amine, said at least one organo-amine comprising a linear amine, a branched amine, a polyamine or mixtures thereof under conditions sufficient to produce said crosslinked polyvinyl-amine material wherein said crosslinked polyvinyl-amine material is produced by adding a crosslinking agent selected from 2,4-bis(chloromethyl)-1, 3,5-trimethyibenzene, 2,4,6-tris-(chloromethyl)-rnesitylene, 1,3,5-tris-chloromethyl-2,4,6-trimethylbenzene, and mixtures thereof, to the reaction mixture of the vinyl halide and organo-amine.

6. The acid gas adsorption-desorption material of claim 5 wherein said at least one vinyl halide is comprised of an aromatic vinyl halide.

7. The acid gas adsorption-desorption material of claim 5 wherein said at least one vinyl halide is comprised of an alkyl vinyl halide.

8. The acid gas adsorption-desorption material of claim 5 wherein said at least one organo-amine comprises a primary amine, a secondary amine, or mixtures thereof, and said polyamine comprises a linear polyamine, a branched polyamine, or mixtures thereof.

9. An acid gas adsorption-desorption material comprising a crosslinked polyvinyl-amine material having a weight average molecular weight of from about 500 to about $1\times10^6$, a total pore volume of from about 0.2 cubic centimeters per gram (cc/g) to about 2.0 cc/g, and an adsorption capacity of at least about 0.2 millimoles of $CO_2$ adsorbed per gram of adsorption-desorption material, or mixtures thereof; wherein said crosslinked polyvinyl-amine material has a formula:

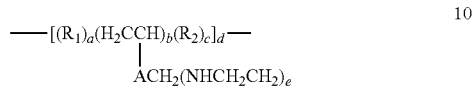

wherein a and c are integers equal to or greater than 0, and b, d, and e are integers equal to or greater than 1, the $NHCH_2CH_2$ groups can be linear or branched, $R_1$ and $R_2$ are the same or different alkyl or aryl moieties provided that at least one of $R_1$ and $R_2$ is comprised of at least one aryl moiety, and A can be an alkyl or aryl moiety.

10. The acid gas adsorption-desorption material of claim 9 wherein said crosslinked polyvinyl-amine material is in the form of particles with an average particle diameter of from about 0.1 microns to about 500 microns.

* * * * *